(12) United States Patent
Nehse et al.

(10) Patent No.: US 11,573,723 B2
(45) Date of Patent: Feb. 7, 2023

(54) METHOD FOR MANAGING EXTENTS OF A SYSTEM HAVING A PROTECTION POOL

(71) Applicant: EMC IP Holding Company LLC, Hopkinton, MA (US)

(72) Inventors: Paul Nehse, Livermore, CA (US); Michael Thiels, San Martin, CA (US); Devendra Kulkarni, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 6 days.

(21) Appl. No.: 17/313,390

(22) Filed: May 6, 2021

(65) Prior Publication Data

US 2022/0357865 A1    Nov. 10, 2022

(51) Int. Cl.
*G06F 3/06*    (2006.01)
(52) U.S. Cl.
CPC .......... *G06F 3/0644* (2013.01); *G06F 3/0604* (2013.01); *G06F 3/067* (2013.01); *G06F 3/0652* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,601,220 B1 * | 12/2013 | Corbin ................. | G06F 3/0647 711/111 |
| 8,806,096 B1 * | 8/2014 | Patil ..................... | G06F 3/0689 710/74 |
| 10,656,841 B1 * | 5/2020 | Huang ................. | G06F 3/0661 |

* cited by examiner

*Primary Examiner* — Nathan Sadler
(74) *Attorney, Agent, or Firm* — Womble Bond Dickinson (US) LLP

(57) ABSTRACT

A method of managing extents of a file system having a protection pool includes collecting and initializing physical extent manager (PEM) metadata, using a PEM daemon thread. The PEM is configured to run on each of a number of nodes. The method also includes creating a request queue, using the PEM daemon thread, for all requests submitted to the PEM. The method also includes scanning the request queue, using a PEM worker thread, to handle incoming requests submitted to the PEM. The method also includes listening for multicast messages, using a PEM multicast listener thread, to be handled by the PEM worker thread.

20 Claims, 15 Drawing Sheets

METHOD FOR MANAGING EXTENTS OF A SYSTEM HAVING A PROTECTION POOL

FIELD OF THE INVENTION

Embodiments of the present invention relate generally to storage applications. More particularly, embodiments of the invention relate to method for managing extents of a system having a protection pool.

BACKGROUND

Customers are increasingly adopting different technologies for data storage. Both appliances and software only packages that can be deployed in a hypervisor environment are desired. The scale up architecture needs to be extensible to be deployed in both physical and virtual environments.

Currently, Data Domain (DD) uses a scale up architecture which may require very large and complex disk farms to meet customer capacity and performance requirements. Protection pool architecture, for example, allows linear scaling of performance and capacity by adding storage nodes. From its inception, DD has been focused on single node appliances.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
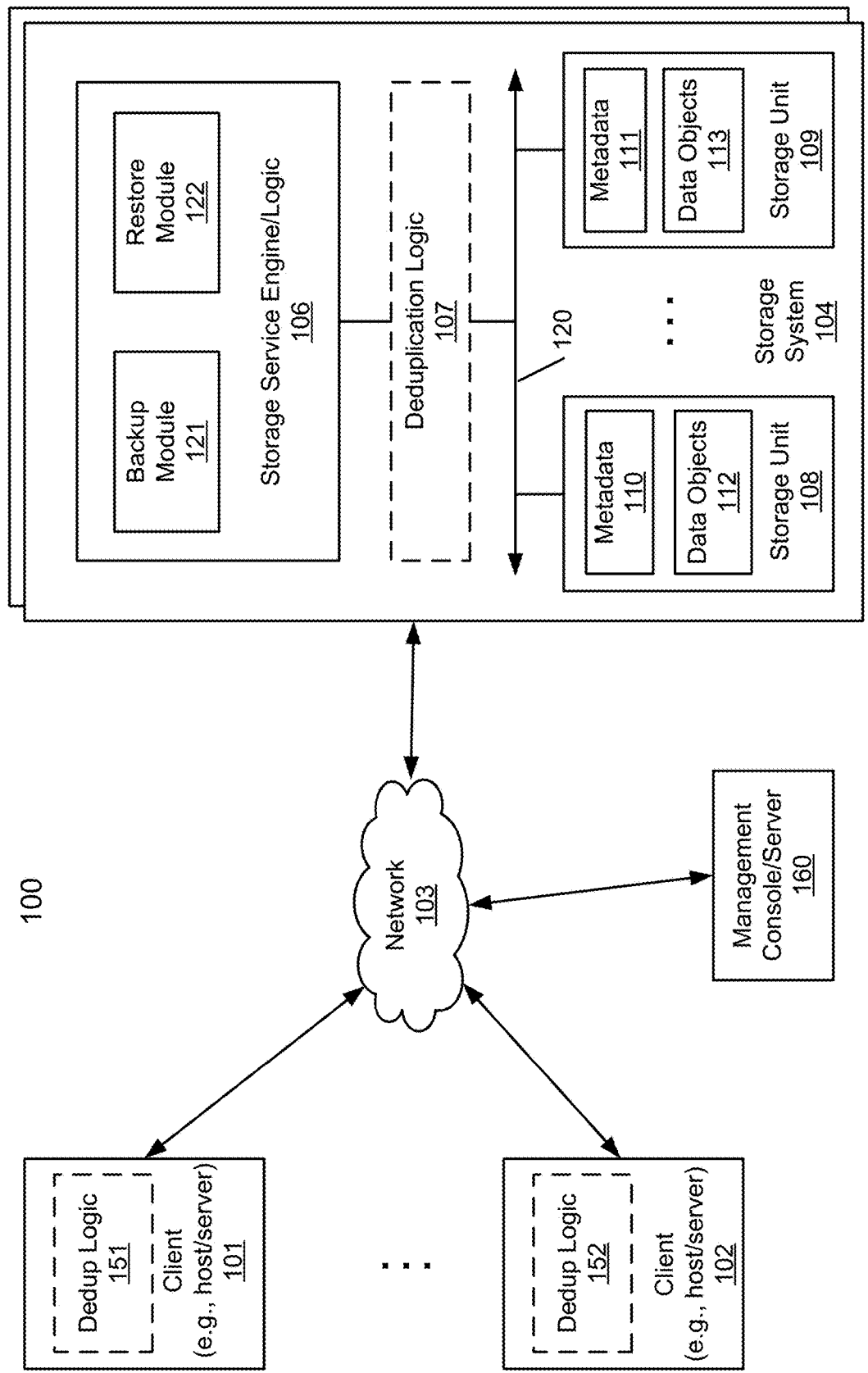
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

An Array Group (AGRP) can be created on any node in a cluster and can migrate to any node in the cluster but can only be assembled on one node at a time. The AGRP may have a unique ID that upper level processes can use to identify and manage the AGRP and its arrays. The cluster uses a shared protection pool that may allow any node in the cluster to access any part of a data storage. In this manner, a collection of partitions can dynamically grow and shrink (when supported by Data Domain File System (DDFS)). In addition, when a node in the cluster fails, the collection of partitions can be migrated to another node so the access to its storage can be maintained. The protection pool also can provide a protected storage that is resilient against at least dual disk and/or single node failures. Changing arrays from directly accessing physical disks to virtual disks may provide a flexibility to where the data reside. Each virtual disk may include a list of Physical Extents (PEs) that indicate the actual data location. The location of the PE can be anywhere within a cluster.

Embodiments of the disclosure relate to a method, apparatus, and system for managing extents in a system having a protection pool. In one aspect, the method includes collecting and initializing physical extent manager (PEM) metadata using a PEM daemon thread. A PEM is configured to run on each of a number of nodes. The method also includes creating a request queue, using the PEM daemon thread, for all requests submitted to the PEM. The method also includes scanning the request queue, using a PEM worker thread, to handle incoming requests submitted to the PEM. The method also includes listening for multicast messages, using a PEM multicast listener thread, to be handled by the PEM worker thread.

Using a protection pool strategy as described above, cluster capacity and performance can be expanded by adding additional nodes. This allows customers to buy smaller capacity nodes and scale the cluster incrementally as requirements change.

In another aspect of the disclosure, embodiments of the present disclosure also provide a non-transitory machine-readable medium and a data processing system perform the processes as described above. In an embodiment, a Physical Extent Manager (PEM) is a daemon running in user space between Volume and the Protection Pool driver. The PEM manages the allocation of Physical Extents (PEs) during file system creation and expansion. Part of managing PEs is the creation of LDMs, AGRPs, and allocation of PEs for Arrays. The PEM is also responsible for managing PE allocation during reconstruction and PE migration when additional storage or nodes are added.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of network such as a local area network (LAN), a wide area network (WAN) such as the Internet, a fiber network, a storage network, or a combination thereof, wired or wireless, in communication with a management console or server 160. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related component configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107, 151, and 152 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored along with data objects 112-113, in at least some of storage units 108-109, such that files can be accessed independent of another storage unit. Metadata of each storage unit includes enough information to provide access to the files it contains.

Protection pool architecture can be designed to work both in virtual and purpose-built backup appliance (PBBA) environments. In addition, the architecture may be extended to adapt easily to hyper converged solutions. The protection pool may be managed by a Physical Extent Manager (PEM) running on each node in the cluster. The PEM on each node may manage the AGRP running on the same node. When capacity is added, the PEM may request allocation of Physical Extents from the Local Disk Manager (LDM) on each node. The array ownership of a Physical Extent (PE) is determined by the LDM owning the disk and all its PEs. When there is a competition between two PEMs creating arrays and requesting the same PE, the LDM may determine which array is granted the PE. The array that is not granted the PE may fail the array creation process and the PEM may need to regenerate a new PE list and request the array create the process again.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
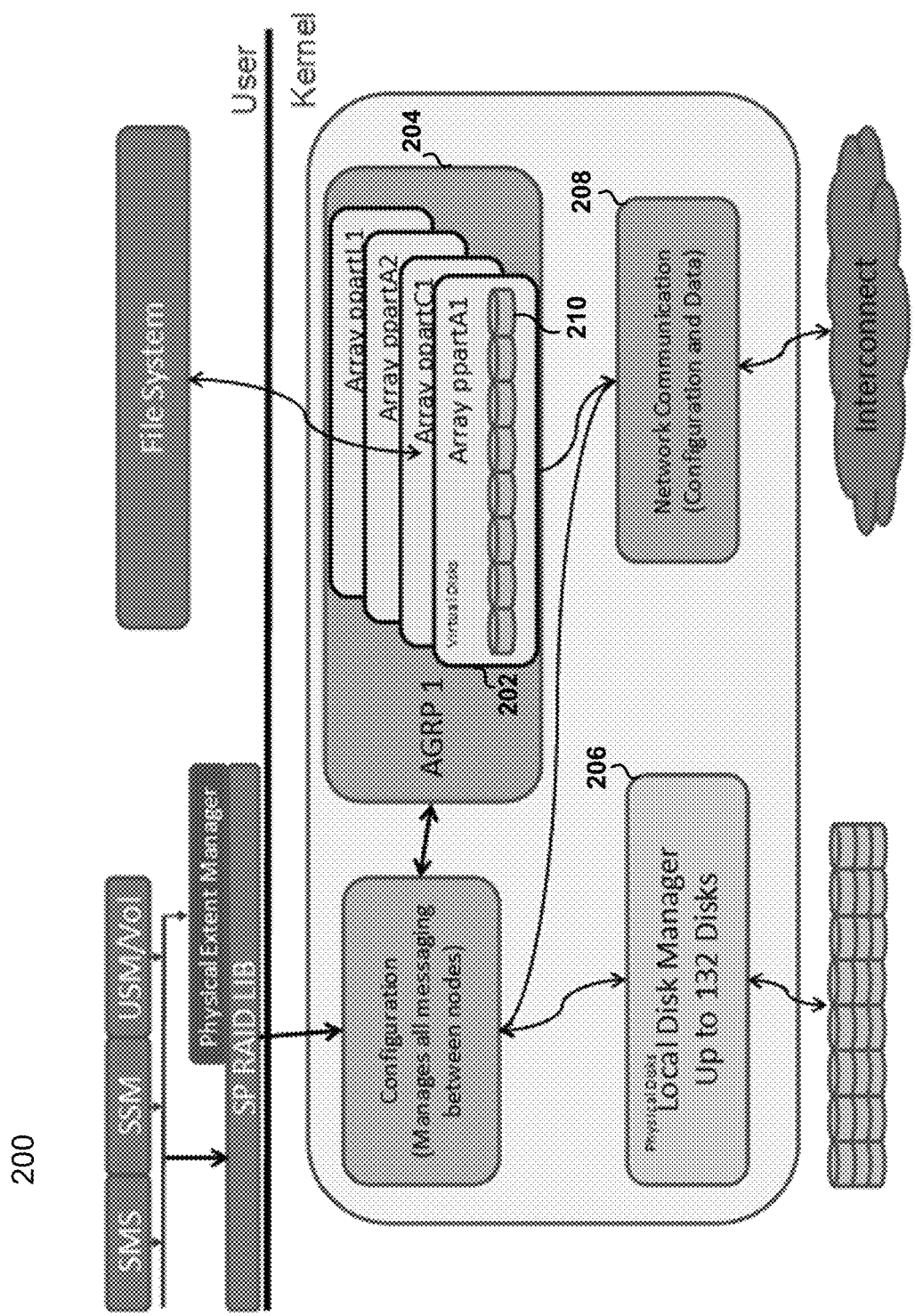
FIG. 2 is an illustration depicting an example of a protection pool driver according to one embodiment.

FIG. 2 is an example of a protection pool driver at one node according to one embodiment. In one embodiment, for example, the protection pool driver may be a Linux kernel module that may be based on the current DD RAID driver providing a stable code base. The main areas of change are in the areas of physical disk management and array management, network management and data transfer. The I/O graphing engine may remain unchanged. The current DD RAID driver manages arrays as part of a Disk Group which ties an array to a physical disk. The protection pool driver may separate the arrays from disk groups. As shown, array group (AGRP1) 204 may include a group of arrays. The group of arrays are then modified to use virtual disks 202 that may include a list of physical extents (PE) 210. In one embodiment, each of the PE may be designated with an address. Therefore, a virtual disk 202 may include a list of addresses that may point to a specific location on a physical disk 206 on a same or different node. The list of addresses may be represented by UUID. The PE may be mapped to a physical disk 206 across the cluster. The disk I/O processing code may have a network component 208 added so when an I/O request is issued it may be redirected to the owning node/disk. Network component 208 may interconnect to other nodes in kernel driver layer. The receiving node may process the I/O request using the existing make disk request code. Once the I/O request is complete, the results may be returned to the requesting node.

A virtual disk 202 may include one or more PEs that may represent a stripe unit index within an array. Virtual disk objects are contained in a virtual disk set and each virtual disk represents a stripe unit index in an array. Up to 24 PEs can be assigned to each virtual disk 202. Each row of PEs in the virtual disk 202 set may act like a small array within the parent array. The allocation of each row may follow the basic rule that each PE in the row is allocated from a different physical disk.

In one embodiment, for example, Local Disk Manager (LDM) may manage the virtual disks 202 on a single node. LDM may divide each virtual disk 202 into PEs and manage the allocation and ownership of these PEs. In another embodiment, the Array Group (AGRP) may manage the arrays that makeup a collection of partitions. The AGRP may manage the creation of arrays and generate a single UUID that can be used to manage all the arrays for reassembling process and migration to another node. The AGRP includes a collection of arrays that belong to the same file system collection partition. Only one AGRP may belong to the same collection partition. The AGRP may be responsible for managing the creation, reconstruction, reassemble, disassemble, and destruction for all associated arrays. The AGRP can be created on any node in the cluster and can migrate to any node in the cluster but can only be assembled on one node at a time. The AGRP may have a unique ID that upper level processes can use to identify and manage the AGRP and its Arrays.

Figure 3:
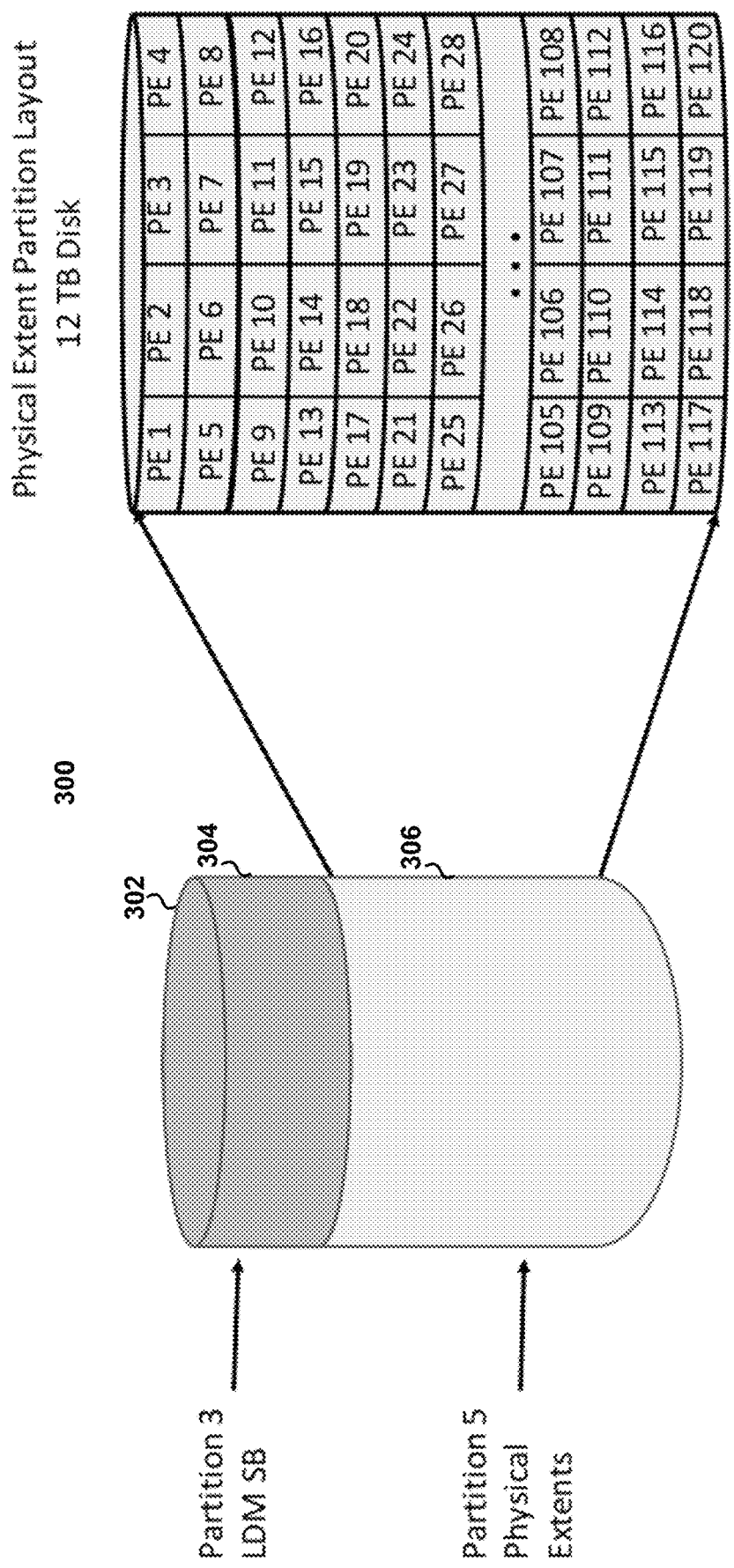
FIG. 3 is an example of a physical extent partition layout according to one embodiment.

FIG. 3 is an example of a physical extent (PE) partition layout 300 according to one embodiment. PEs are the basic unit of a storage allocation in the protection pool. A PE is a span of contiguous Logical block addressing (LBA) on a physical disk 302. The physical disk 302 may be divided into a number of PEs, wherein each PE has an equal size. The size of a PE may be the same for all PEs across the cluster. The physical disk 302 may be divided into partition 3 304 and partition 5 306. Partition 3 may include metadata storing the mapping information between the PE and the location on the physical disk. As shown in FIG. 3, a 12 Terabyte (TB) partition of a physical disk 302 may be divided into equally sized PEs. The PEs may be contained within a partition on a disk. For example, as illustrated in FIG. 3, Partition 5 306 may include 120 PEs (e.g., PE1, PE2, PE3, . . . , PE120). In this manner, keeping the PEs within a partition 5 allows the disk to be used for multiple uses if needed. It may not be a requirement that all physical disks in the cluster have the same capacity. In one embodiment, all physical disks may have the same capacity for a PE allocation management. In some embodiments, for example, the PE size for a protection pool cluster may be 96 Gigibyte (GiB) for a virtual appliance and may be 186 GiB for a standalone PBBA.

Figure 4:
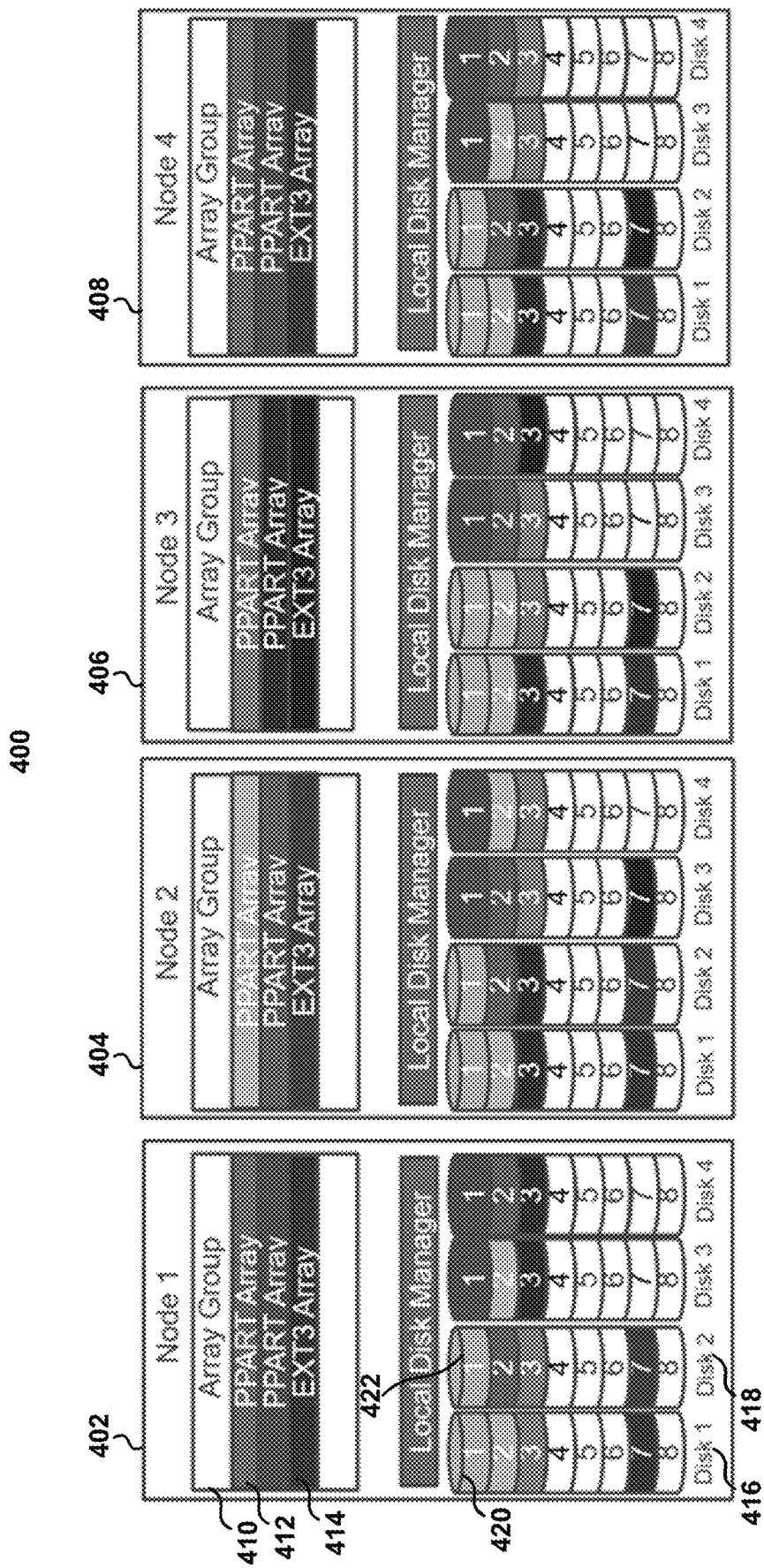
FIG. 4 an example of a PE layout for a cluster in a multi-node environment according to an embodiment.

FIG. 4 illustrates an example of a PE layout for a cluster 400 in a multimode environment according to an embodiment. Referring to FIG. 4, the cluster 400, for example, may include a four-node cluster in which each node has an array group (e.g., 410) with two PPART 6+2 arrays (6 data drives and 2 parity drives) and one EXT3 3-way mirrored array. In one embodiment, the parity drives may include XOR and Reed Solomon parity drives.

As shown, each node may include four virtual disks (Disk1, Disk2, Disk3, Disk4). A virtual disk (e.g., Disk1) can support multiple PEs (e.g., 8 PEs). The number (1, 2, 3, 4, 5, 6, 7, 8) on each virtual disk represents PE number. As shown in FIG. 4, each virtual disks include a specific PE having a specific number. For example, Disk1, Disk2, Disk3, Disk4 can include PE #1. Two virtual disks (e.g., Disk1 416 and Disk2 418) on each node can include one PE (PE #1 420 and 422). Disk1 and Disk2 on nodes 402, 404, 406, 408 can include PE #1 associated with the data of PPART Array. Data associated with EXT3 Array can be distributed in PE #7 in Disk1 on nodes 402, 404, 406. In this manner, this PE layout 400 can support two failed physical disks or one failed node. Note that the number of PE within a virtual disk of the present disclosure is not limited to what is shown in the layout of FIG. 4.

As previously described, node 1 402 may include array group 410 having three arrays (e.g., two PPART arrays 412 and an EXT3 array 414 as shown). Data associated with the first array of the array group 410 in node 1 402 are distributed to each node in the cluster 400. In this manner, data can be spread across multiple nodes.

A collection of physical extents (PE) that are grouped together can create an array. The PEs are grouped into virtual disks with up to 24 PEs per virtual disk. There is no restriction as to which physical disk or node the PE resides on, but the allocation of PEs on physical disks for an array may be managed so that PEs in one PE row are not allocated on the same physical disk.

PEs are managed by the Physical Extent Manager (PEM) and PE ownership is verified and approved by the owning LDM at array creation, array expansion or allocation of a spare PE. Arrays may be created for different uses and RAID levels. Some arrays may be created for use by only the local node used for Operating System (OS) and configuration data relevant to that node. When an array is created, the RAID level is assigned and there is no requirement that all the arrays have the same RAID level or the same number of PEs. All the RAID levels supported by the current DD RAID driver are supported in the protection pool driver.

The Protection pool driver uses a 128-bit UUID that is used to identify AGRPs, Arrays, LDMs, LDM Disks, and Physical Extents. The UUID layout allows mapping of Arrays to AGRPs or a PE offset to a disk, a LDM and a Node. Below table illustrates an example of the 128-bit UUID.

TABLE 1

| Type | Bits 95-127 | Bits 64-95 | Bits 32-63 | Bits 0-31 |
|---|---|---|---|---|
| AGRP UUID | AGRP Magic Number | 32 bit AGRP UID | Reserved | Reserved |
| Array UUID | AGRP Magic Number | 32 bit AGRP UID | 32 bit Array UID | Reserved |
| LDM UUID | 32 bit Node UID | 32 bit LDM UID | Reserved | Reserved |
| LDM Disk UUID | 32 bit Node UID | 32 bit LDM UID | 32 bit disk UID | Reserved |
| PE UUID | 32 bit Node UID | 32 bit LDM UID | 32 bit Node UID | 32 bit PE Offset |

Each PE may be assigned a UUID (herein after "PE UUID") when an associated disk is added to an LDM. PE UUID may be used to identify the location of the extent. The PE UUID may include four 32-bit parts that may describe the location of each PE. In some embodiments, the PE UUID may include a NODE UUID, LDM UUID, DISK UUID, and the PEs physical LBA offset within the PE partition of the disk. One example of the PE UUID is shown below:

|  | Node | LDM | Disk | Extent |  |  |
|---|---|---|---|---|---|---|
| Row: 1 Vdisk: 0 | 0x11111111 | 0x620E0700 | 0xE1640700 | 0x00000008 | In | Use |
| Row: 1 Vdisk: 1 | 0x11111111 | 0x620E0700 | 0x4646F000 | 0x00000008 | In | Use |
| Row: 1 Vdisk: 2 | 0x22222222 | 0xA6D7FD00 | 0x5A46D400 | 0x00000008 | In | Use |
| Row: 1 Vdisk: 3 | 0x22222222 | 0xA6D7FD00 | 0xF479BA00 | 0x00000008 | In | Use |
| Row: 1 Vdisk: 4 | 0x33333333 | 0xFD5D6200 | 0xE3839B00 | 0x00000008 | In | Use |
| Row: 1 Vdisk: 5 | 0x33333333 | 0xFD5D6200 | 0x6BA23600 | 0x00000008 | In | Use |
| Row: 1 Vdisk: 6 | 0x44444444 | 0x7FB69600 | 0x62521800 | 0x00000008 | In | Use |
| Row: 1 Vdisk: 7 | 0x44444444 | 0x7FB69600 | 0x215B7500 | 0x00000008 | In | Use |

The 128-bit AGRP UUID is used to keep all the arrays that make up a collection partition under one umbrella. The AGRP UUID may include a 32-bit magic number and a 32-bit AGRP UID. As arrays are created, the Array UUID is created by using the AGRP base UUID and adding the 32-bit Array UID. Keeping the Arrays under the AGRP UUID allows the AGRP and all its components to move to different nodes by only using the AGRP UUID.

The 128-bit LDM UUID is used for multiple purposes. It indicates which node owns the LDM, and which disks belong to the LDM. Also, it provides the PE location. When a LDM is created the base LDM UUID is made up of the node UID and the LDM UID. As each disk is added a disk UUID is created for each, it uses the LDM base UUID and adds the disk UID. When PE UUIDs are created the PE offset is shifted right 23 bits and that value becomes the PE UID. The PE UID is then added to the disks UUID to create a PE UUID for each PE.

When processing a I/O disk request from the file system, the array passes information associated with the PE. The information associated with the PE may include the PE UUID identifying a PE location, a stripe offset within the PE, and a data buffer.

Figure 5:
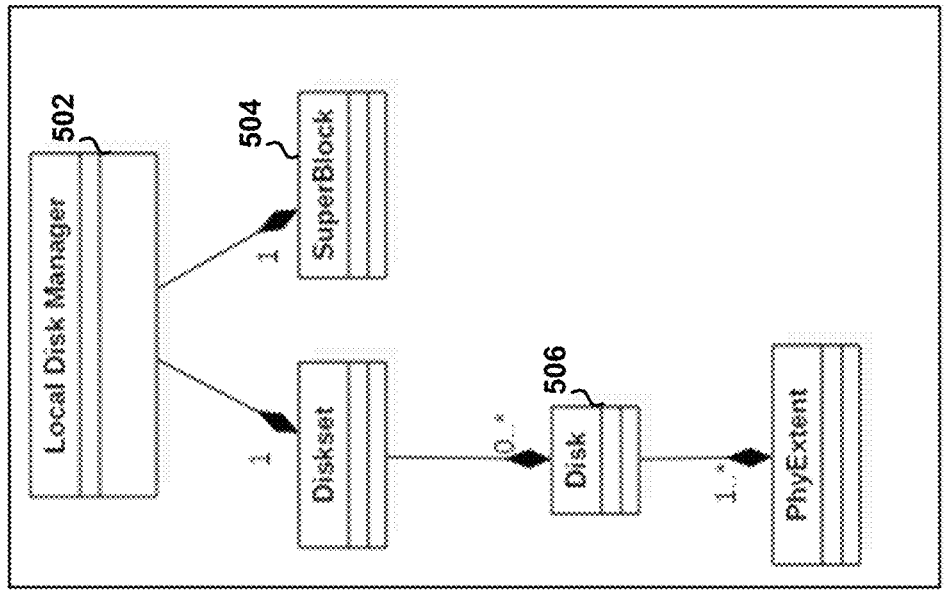
FIG. 5 is an illustration depicting an example of local disk manager according to one embodiment.

FIG. 5 shows an example of Local Disk Manager (LDM) architecture according to one embodiment. LDM 502 may replace Disk Group module. LDM 502 manages the physical disks on a node. LDM 502 may be responsible with an initial creation of a PE map, PE allocation, proactive disk error monitoring, disk failure management, maintaining the current state of disks and PEs, and managing LDM Meta data in SP RAID superblock 504. One or more LDMs 502 can be present on a single node. Having more than one LDM 502 may allow disks 506 to be grouped based on disk characteristics. A single LDM 502 can manage up to 132 disks (2 DS60 and one shelf of cache disks). The LDM 502 may manage allocation and current ownership of a devices PEs, as arrays are created the creation process may request allocation from all LDMs owning PEs. The LDM may allocate the PEs and store the current owner in LDMs superblock data. When the system is booted the LDM may provide the current state for all PEs to upper level processes. When disk(s) are added to an LDM each disk may have a performance group assigned. This may allow the Physical Extent Manager to allocate array in different performance tiers. The LDM may also monitor the physical disk error counters and notify the Physical Extent Manager (PEM) that a disk has exceeded an error threshold and needs to be replaced. When a write error occurs, the array may fail the PE and notify the LDM that the PE has failed. The LDM may fail the disk, notify each array that have PEs allocated on the failing disk, broadcast a message to PEMs on all nodes indicating a disk failed, all arrays that failed PEs may run in a degraded state until a replacement PE is issued from PEM, when the array received new PE(s) a reconstruction is started.

Figure 6:
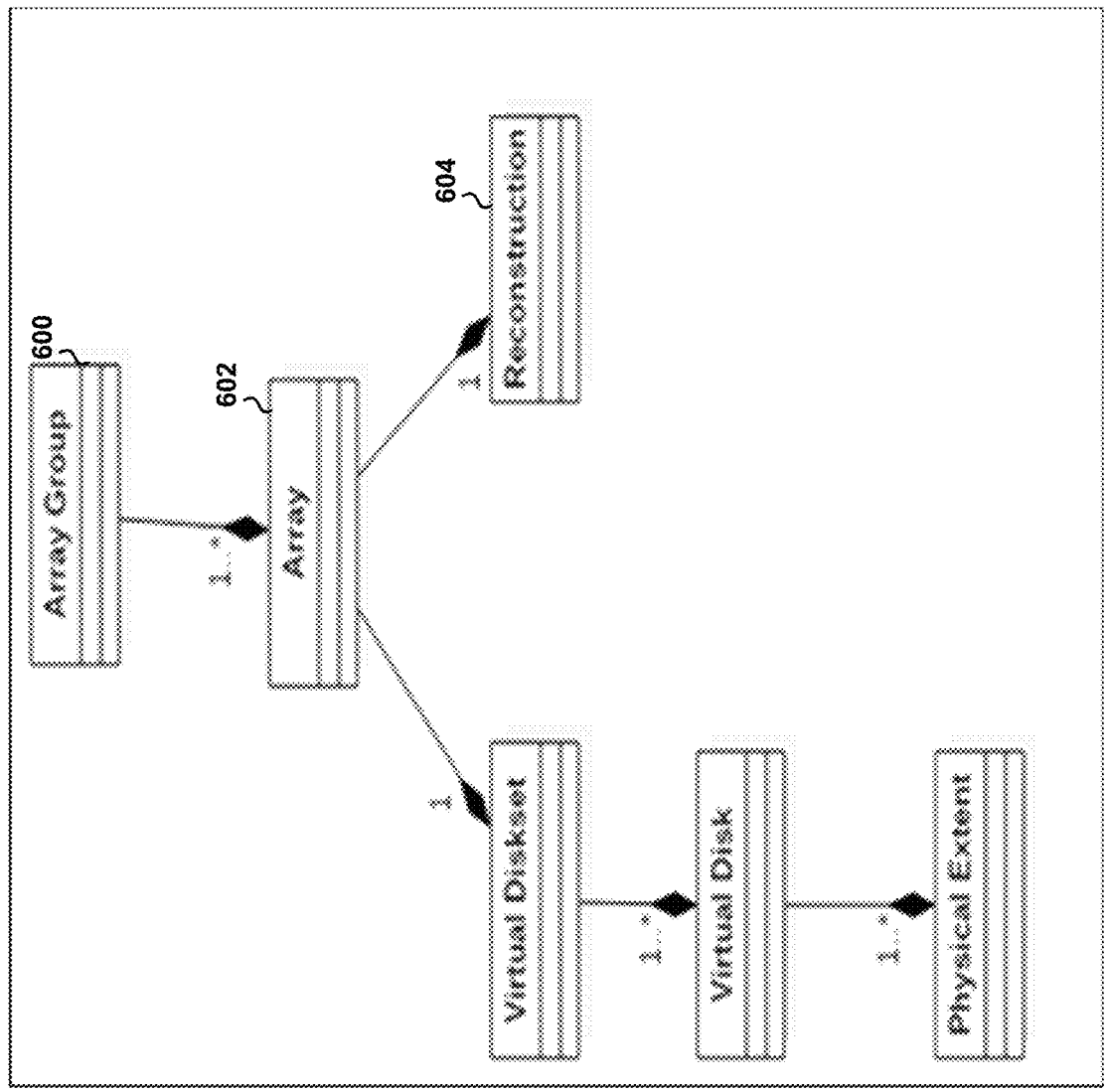
FIG. 6 is an illustration depicting an example of array group according to one embodiment.

FIG. 6 shows an example of an Array Group (AGRP) 600 having a collection of arrays 602 that belong to the same file system collection partition according to one embodiment. In one embodiment, only one array group can belong to the same collection partition. The array group 600 may be configured for managing the creation, reconstruction 604, reassemble disassemble and destroying all associated arrays 602. The AGRP 600 can be created on any node in the cluster and can migrate to any node in the cluster but can only be assembled on one node at a time. The AGRP 600 may have a unique ID that upper level processes can use to identify and manage the AGRP and its arrays.

There are two types of reassembles: 1) LDM and 2) AGRP. When a node is booted the LDM may be reassembled when PEM module is started. This may allow all the nodes in the cluster to gather the necessary information to manage AGRP reassembles. The LDM provides AGRP reassembly data and state for all PEs managed by that LDM. The LDMs contain metadata information of all AGRPs. Once there are enough LDMs available the AGRP can be reassembled on their respective nodes. The ARGP reassemble is directed by a cluster manager through Volume and may instruct the nodes to reassemble specific AGRPs. AGRP reassemble all its associated arrays, during the array reassemble the state of its PEs are verified. The AGRP and its arrays can only be assembled on one node at a time but can be assembled on any node in the cluster.

Reconstructions may be started for many reasons (e.g., user request fail disk, failed write on a PE, rebalancing, exceed error thresholds). The reconstruction process may be managed by the PEM and performed on PE boundaries. Four types of reconstruction may be supported including full, copy, migrate and failback. The reconstruction of PEs from one physical disk may use spare PEs from multiple physical disks, because there are multiple PEs being reconstructed this allows simultaneous reconstructions. Having multiple concurrent reconstructions reduces the overall reconstruction time. When performing distributed sparing, it may cause rebalancing overhead once the failed disk is replaced. Once a disk is added to an LDM, PEM may start slowly migrating PEs to the newly added disk.

A file system collection partition contains elements from the active tier, cache tier and cloud tier, in the current DD RAID driver each tier is identified in the associated Disk Group. The protection pool driver no longer supports the concept of a Disk Group and the tier may be identified in each array in an AGRP.

Figure 7:
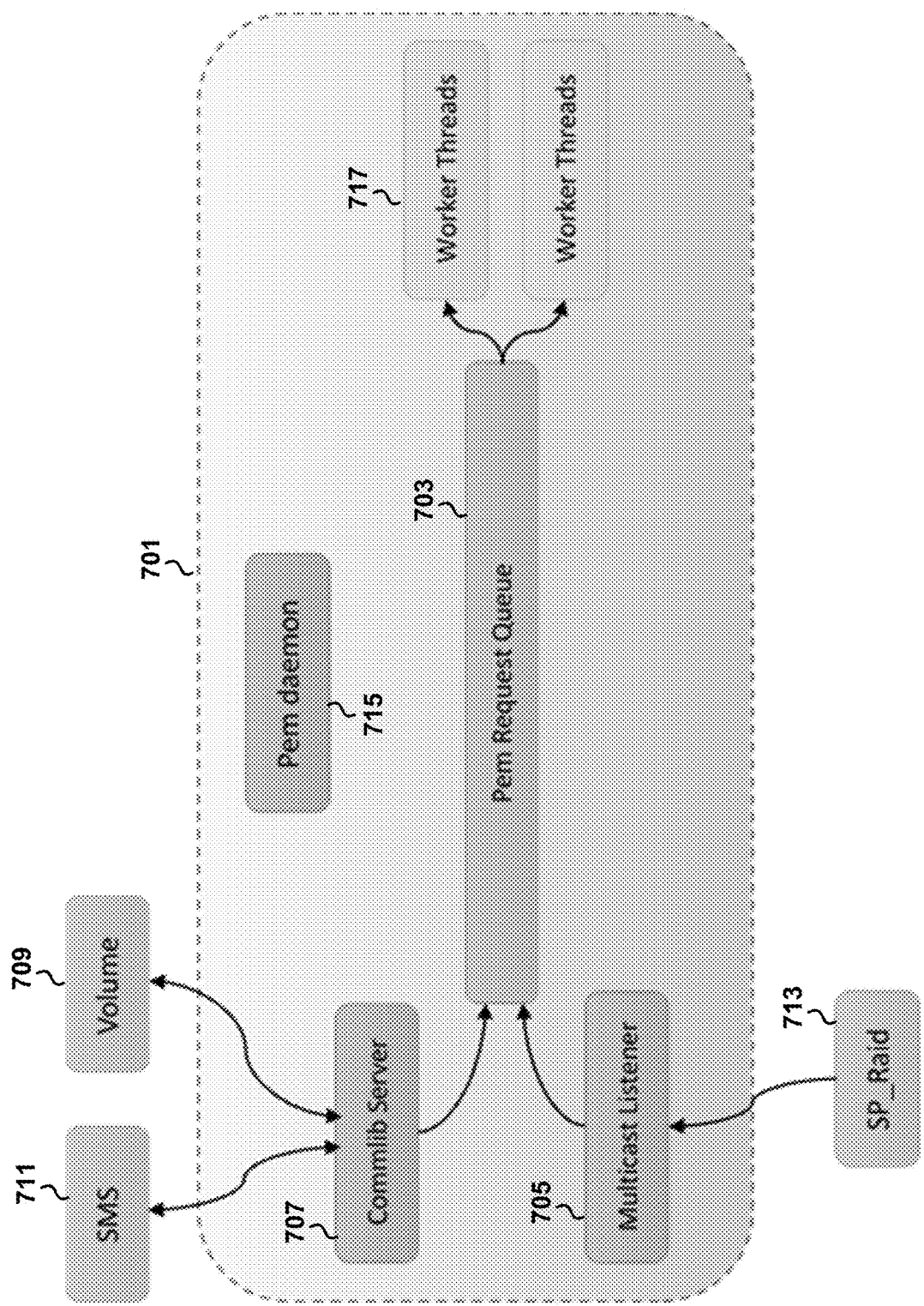
FIG. 7 is an example of a PEM 701, according to one embodiment.

FIG. 7 is an example of a PEM 701, according to one embodiment. In this embodiment, the basic PEM 701 design can be broken down into a few components, including metadata, daemon thread 715, worker threads 717, a PEM request queue 703, a Commlib server thread 707, and a multicast listener 705.

In an embodiment, the PEM metadata includes all the information that PEM 701 uses while handling each of the requests. It contains information on each node in the cluster. The information on each node includes all the current array groups, arrays, virtual disks, local disk managers, disks and extents. All the information is organized in simple link lists and is easily scalable.

In an embodiment, the PEM daemon thread 715 starts out with collecting and initializing PEM metadata. It then creates a PEM request queue 703 where all incoming requests are sent. This is followed by spawning worker threads 717 for handling queued requests, a Commlib server thread 707 to listen for requests, and a multicast listener thread 705 to wait for any system events. In an embodiment, the PEM daemon thread 715 can remain in a loop waiting for a TERM or HUP signal. The HUP signal causes it to refresh PEM metadata, while the TERM signal causes it to shutdown PEM daemon 715. During the shutdown procedure, it signals the COMMLIB server thread 707 and multicast listener thread 705 to terminate, followed by the flushing on request queue and termination of worker threads 717. The final operation is to free the metadata memory before exiting.

In an embodiment, the PEM daemon thread 715 creates a worker thread pool context and spawns one or more worker threads 717 based on the calling parameters. These worker threads 717 are responsible for handling all the requests that come from volume 709, SMS 711, and multicast messages. The worker threads 717 continuously scan the request queue and if a work item is found, it is removed from the queue and processed. Once the request is processed, a final status is returned along with any new UUID that was generated as a result of processing the request.

In an embodiment, the PEM request queue 703 is a FIFO queue serviced by the PEM worker threads 717. The queue is protected by a mutex and has some queue flags to indicate queue states like closed and shutdown. The queue closed is a temporary state to block any new request from being added to the queue. The shutdown state is used when PEM daemon has received a TERM signal and is shutting down. It also has a few conditional variables for other queue states like full, empty etc. Each work item contains a handling function pointer and an arguments pointer for the request.

In an embodiment, the Commlib server thread 707 waits for any requests that come in for PEM 701. These requests could come in from volume 709, SMS 711, or PEM clients. Once the commlib server thread 707 receives a request, it allocates a queue element called a work item, and then enqueues it into the PEM request queue 703. The request will then be handled by the worker threads 717. Since, all the current requests are synchronous, the COMMLIB server thread 707 waits for completion of work item processing before replying back to the requestor. Depending on the request, if there is a new UUID that gets generated then it will return that to the requestor as well.

In an embodiment, the multicast listener thread waits for any multicast messages from SP RAID driver 713. These messages could be about any system events like drive failures, completion of copy, or full reconstruction, etc. These events would require PEM to take some action like using spare extents for failed ones or updating the state of one or more extents after a reconstruction completes. On receiving a message, the multicast listener thread 705 can allocate a work item and add it into the PEM request queue 703. The request can then be handled by the worker threads 717.

In an embodiment, the PEM can be responsible for all extent-related management during new storage addition, file system creation/expansion/destruction, array group creation/destruction, array creation/expansion/destruction, extent copy/full reconstruction, drive and node failures etc. In an embodiment, to implement the protection pool the raid driver code has undergone significant code changes in terms of allocating and managing storage on disks. Storage allocation and management is then done using small blocks of storage (or PEs) scattered over multiple disks. Furthermore, the multiple disks used in storage allocation could be residing on the same node or multiple nodes in a protection pool cluster. Interfacing with this new RAID driver requires substantial changes in the Volume layer as well. Having a PEM 701 helps to minimize this impact on Volume code. In an embodiment, the PEM 701 exists in user space and sits between Volume 709 code layer and the RAID driver 713. The SMS component 711 can also interact with PEM 701 for the initial storage add (fresh install) and storage expand cases.

In an embodiment, all the extent manager services can be provided by a PEM daemon 715. Each node in a protection pool cluster can run an instance of PEM daemon. Each PEM instance can be aware of all the storage available across all nodes throughout the cluster. This information can be gathered by each PEM instance by requesting it from a local RAID driver 713.

In an embodiment, a PEM instance gathers all the information about a cluster by talking to the RAID driver 713. The cluster information includes all nodes, array groups, arrays, virtual disks, local disk managers, disks, extents etc. There is no "Master" or "Slave" configuration within all PEM instances, in some embodiments. Each PEM instance is on its own handling the requests of volume and SMS instances on local nodes.

The techniques disclosed herein provide a number of advantages, including the user-space module managing disk physical extent allocation, as well as layout of physical extents for the RAID driver. The PEM also is able to communicate with other nodes and view PE availability. As a user-space module, the PEM provides user-space library available to other user space components that need their requests to be completed by the RAID driver, thereby streamlining communication between modules. As a stateless module, PEM always keeps its metadata information up to date by periodically gathering information from the RAID driver. Furthermore, as a user-space module, PEM provides much more flexibility in debugging problems, and causes much less of an impact on system uptime.

Figure 8:
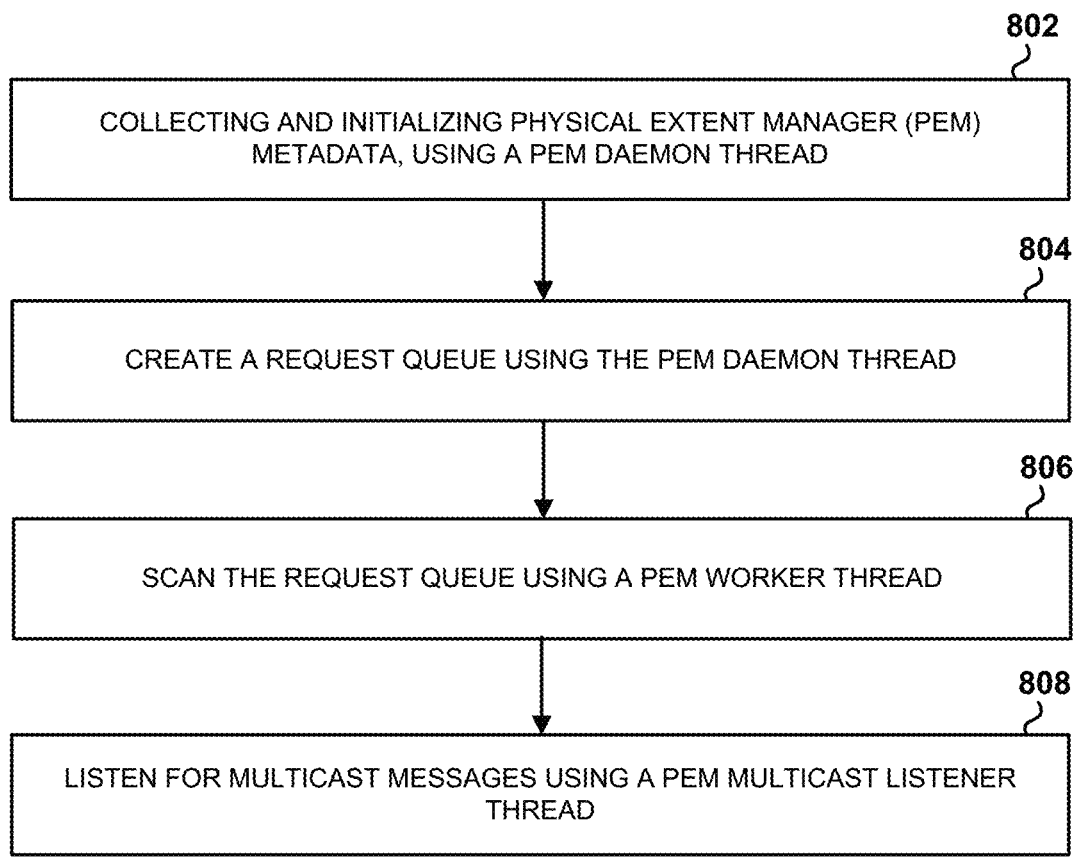
FIG. 8 is a flow diagram illustrating method for managing extents of a system having a protection pool, according to an embodiment.

FIG. 8 is a flow diagram illustrating method 800 for managing extents of a system having a protection pool, according to an embodiment. At operation 802, a PEM daemon thread collects and initializes PEM metadata. As discussed above, a PEM is configured to run on each of a number of nodes.

At operation 804, the PEM daemon thread creates a request queue for all requests submitted to the PEM. In some embodiments, the requests can include requests for the PEM worker thread to perform any one of a number of actions, each of which is discussed in more detail below. In an embodiment, the PEM worker thread can add a new storage node for use by the protection pool. The worker thread can also be configured to create, expand, or destroy a file system including at least one AGRP with one or more arrays. The PEM worker thread can also be configured to create or destroy an AGRP. In some embodiments, creating an AGRP can create an empty array group, and destroying an AGRP automatically destroys any arrays within the AGRP. The PEM worker thread can also be configured to create, expand, or destroy an array; or to destroy a LDM and free up al storage managed by the destroyed LDM.

At operation 806, a PEM worker thread scans the request queue to handle incoming requests submitted to the PEM. The incoming requests can include those discussed above, including for example: adding storage, creating/expanding/destroying a file system, creating/destroying an array group, creating/expanding/destroying an array, etc.

In operation 808, a PEM multicast listener thread listens for multicast messages to be handled by the PEM worker thread. In some embodiments, the PEM worker thread can also be configured to handle multicast requests having multiple sub-requests.

In an embodiment, a request to add storage can add new storage to a node so that it can be used by the protection pool. In an embodiment, PEM accepts a list of devices, creates two partitions on each device (one for storing LDM superblock and the other for physical extents), and requests SP RAID to either create a new LDM for these devices or add them to an existing LDM. The device count can be more than what's supported by one LDM, and in such a case PEM can request to create more than one LDM.

In an embodiment, a request to create a file system creates a new array group with one or more arrays under it. The requested capacity size can dictate how many arrays are created. If more than one array is created, then PEM will try to keep all the arrays extent rows evenly balanced. After the request is processed, the array group UUID can be returned along with the status. In one embodiment, the PEM code has a provision to create and support more than one AGRP if requested, but currently one AGRP will manage the capacity on one collection partition.

In an embodiment, a request to expand a file system can expand an existing array group by a requested size. While processing this request, PEM can add one or more new arrays or also increase the size of existing arrays. In the end all the arrays should be as evenly balanced as possible to provide the best performance to file system. After the request is processed, the existing array group UUID is returned along with the status.

An AGRP may represent multiple volumes of different tiers within a file system, and a request to destroy a file system can destroy one or more volumes. As part of the request parameters, PEM needs UUID's of the AGRP and the tier type being destroyed. On processing the request, all arrays specified tier type within the AGRP are destroyed, all the freed extents are now available for new allocation requests. The AGRP is only destroyed when all arrays have been destroyed.

In an embodiment, the PEM worker thread can create a new AGRP. This request will create a new AGRP. The UUID of this newly created AGRP can be returned to the requestor along with the status. The new AGRP will be empty with no arrays in it, in some embodiments. A request to destroy an AGRP can contain the UUID of the AGRP and the tier type of the arrays being destroyed. Any arrays inside AGRP that match the tier type will automatically get destroyed as a result of processing this request.

In an embodiment, the PEM worker thread can create a new array. The request parameters can contain UUID of the AGRP under which the new array will be created. The requested array size can dictate how many extents are allocated in the array. PEM can also add parity extents based on the number of data extents being allocated. The total number of extents then can be rounded up to the nearest extent row size, based on the RAID scheme used. PEM can then allocate extents diagonally across disks, which is currently the default allocation scheme. PEM can also attempt to keep the extent offset the same within a row. After successful allocation of the array, it's UUID is returned by SP RAID and is passed to the requestor along with the status.

In an embodiment, a request to expand an array can expand an existing array. This request will expand an existing array. The request parameters can contain the array UUID which needs to be expanded. All other parameters are the same as a request to create an array. In an embodiment, the computation of total extents and allocation scheme is done in the same way as creating an array. After expanding the array, the array UUID along with status can be returned back to the requestor.

In an embodiment, the PEM worker thread can destroy an existing thread. The request parameters to destroy an array can contain the array UUID which needs to be destroyed. In an embodiment, a successful completion can return the status back to the requestor. All the freed-up extents are available for allocation to new requests.

In an embodiment, a multicast request can have multiple sub-requests. In an embodiment, a multicast request supports handling a drive failure, which contains a list of extents on a failed disk. The PEM can pick a spare extent for each of the failed extents, following the same rules as it would on a new allocation, and send a request to SP RAID with a list of spare extents to replace the failed ones. This would be an asynchronous request wherein there would be a multicast message to indicate the end of a copy or full reconstruction of each extent. PEM would have to take each of those messages and update the extents states in metadata.

In an embodiment, a request to destroy a LDM can free up all the storage (physical disks) managed by the LDM. The request parameters can contain the name of the LDM to be destroyed so the PEM can find the corresponding UUID of the LDM. The PEM can also check if any of the disks under that LDM are used by an existing AGRP, and if that's the case then the request can be rejected. If none of the disks managed by the LDM are being used, then PEM can send the request to destroy that LDM. A final status can be returned back to the requestor after the LDM is destroyed.

Figure 9A:
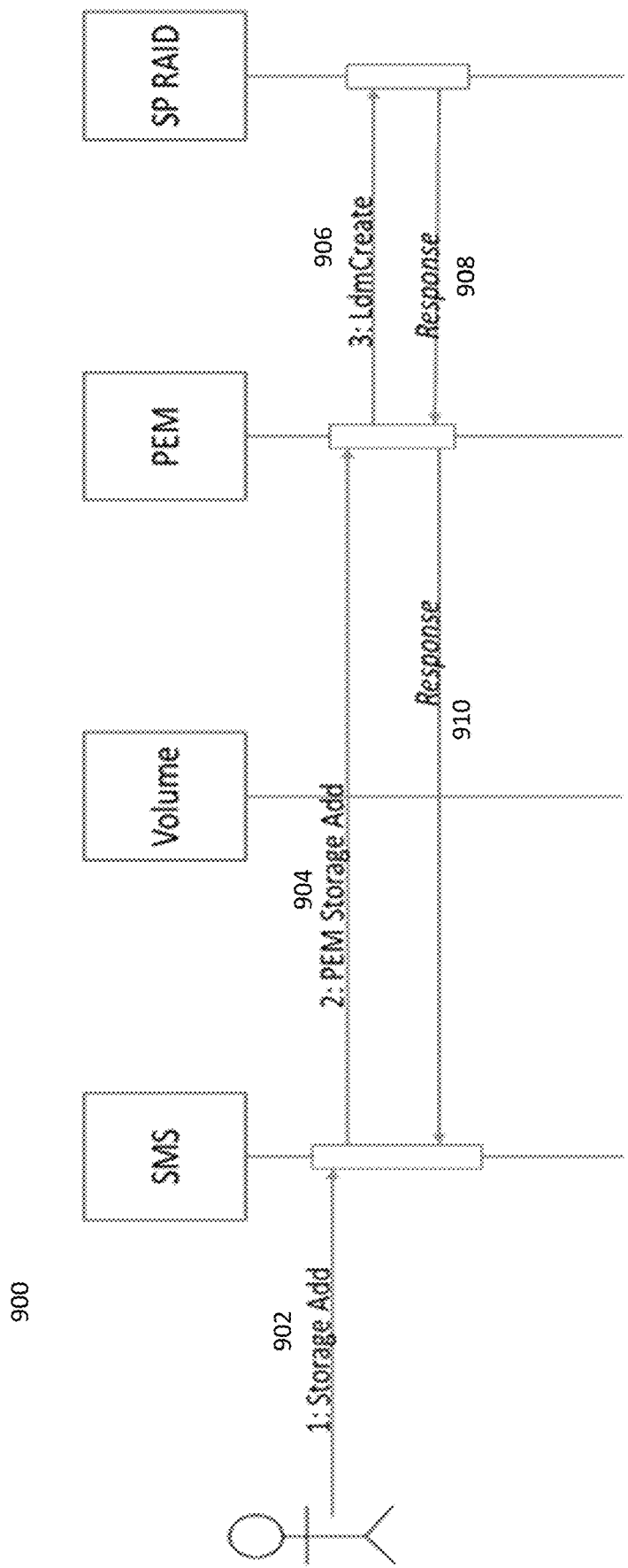
FIG. 9A is a flow diagram of an example method of adding disks in a RAID data storage system with a protection pool of storage units, according to some embodiments.

FIG. 9A is a detailed flow diagram 900 of a method of adding disks in a RAID data storage system with a protection pool of storage units, according to some embodiments. For example, method 900 PEM, LDM, AGRP, Array, or a combination of such, which can be implemented in software, firmware, hardware, or any combination thereof.

Method 900 begins at operation 902, where a storage management system (SMS) receives a request to add storage to make additional storage available for use in the SMS. At operation 904, the SMS may issue a request to the PEM to make the additional storage (i.e., additional disks) available for use by the SMS. The request may include a list of the disks to make available and a performance group associated with the disks. In response, the PEM may partition the disks into several physical extents (PEs). At operation 906, the PEM may send a request to an SP RAID driver to generate an LDM for the added disks and to add the additional disks to the LDM. The SP RAID driver may initialize a physical extent map and save metadata of the disk. The LDM may then provide a response to the PEM that the LDM has been created (operation 908). The PEM may initialize an internal data object and add the new PEs to a list of free PEs available to be assigned to Arrays. The LDM may provide a response to the SMS that the disks have been added successfully (operation 910).

Figure 9B:
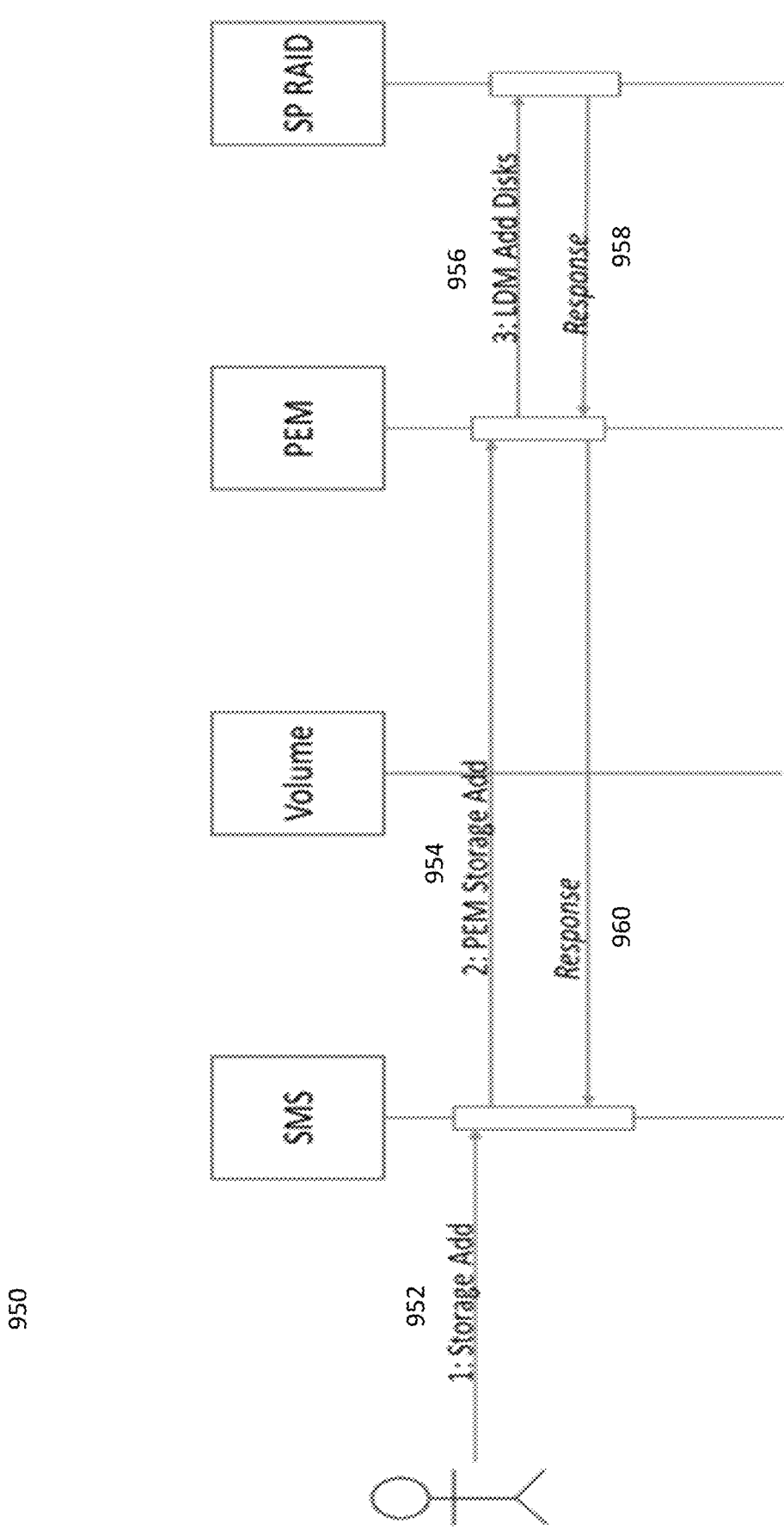
FIG. 9B is a flow diagram of another example method of adding disks in a RAID data storage system with a protection pool of storage units, according to some embodiments.

FIG. 9B is a detailed flow diagram 950 of a method of adding disks in a RAID data storage system with a protection pool of storage units, according to some embodiments. For example, method 950 PEM, LDM, AGRP, Array, or a combination of such, which can be implemented in software, firmware, hardware, or any combination thereof.

The method 950 begins at operation 952, where an SMS receives a user request to make additional storage available for use by the user of the SMS. The request may include a list of the enclosures or disks that are to be added. At operation 954, the SMS generates a list of DM devices and requests the PEM to make the additional disks available for use. The PEM may partition the additional disks in response to receiving the request. At operation 956, the PEM issues a request to the SP RAID driver to add the list of additional disks provided to an existing LDM, or create and additional LDM if needed. The SP RAID driver may provide a response that the addition of the disks was successful (operation 958) and the PEM provides a response to the SMS that the addition of the list was successful (operation 960).

Figure 10:
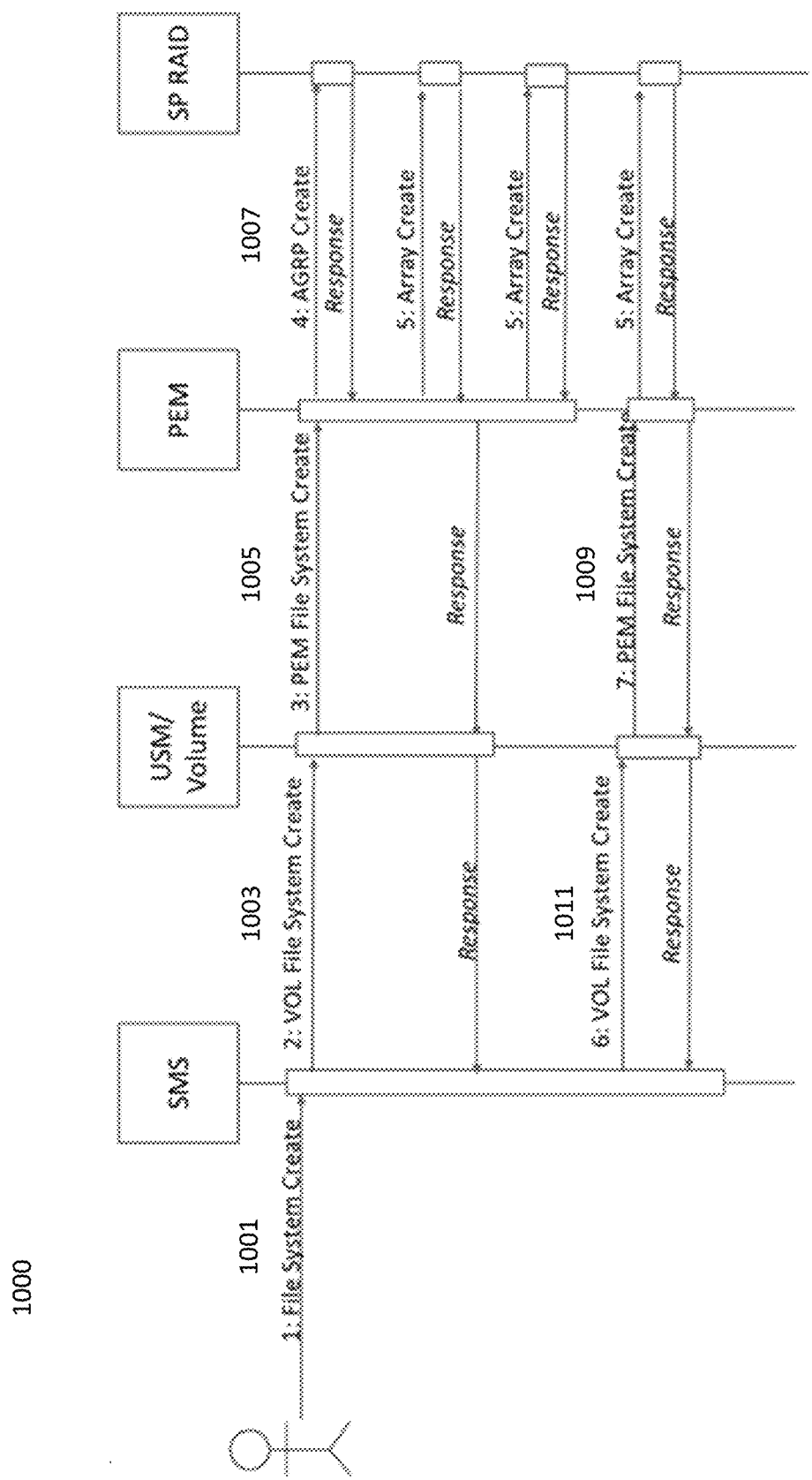
FIG. 10 is a flow diagram illustrating a method of creating a file system, according to one embodiment.

FIG. 10 is a flow diagram illustrating a method 1000 of creating a file system, according to one embodiment. For example, method 1000 can include a number of operations, as outlined in Table 2, below.

TABLE 2

| Block | Description | Parameters |
|---|---|---|
| 1: 1001 | User requests SMS create a file system. (Storage add must be completed prior to requesting a file system create). | |
| 2: 1003 | SMS checks the capacity license and requests Volume to create file system. USM will request PEM to create the necessary AGRP and array(s). | Capacity, tier type |
| 3: 1005 | PEM will issue a request to the SP RAID driver to create an AGRP (step 4). After the AGRP is created PEM will start laying out physical extents for each array, based on the number of physical extent available PEM will repeat steps 5 and 6. PEM will request the SP RAID driver to create one or more arrays | Capacity, tier type |
| 4: 1007 | SP RAID driver is requested to create an empty Array Group | AGRP Name |
| 5: 1007 | SP RAID driver is requested to create array (This step is repeated as needed to meet the capacity request from file system create) | Array info. List of VDISK, tier type |
| 6: 1011 | When more than one storage tier is needed, SMS will issue another file system create request to USM to create another volume of a different tier type | Capacity, tier type |
| 7: 1009 | PEM is requested to create more arrays of the new tier type. The new arrays are created with the new tier type and added to the existing AGRP. | Capacity, tier type |

Figure 11:
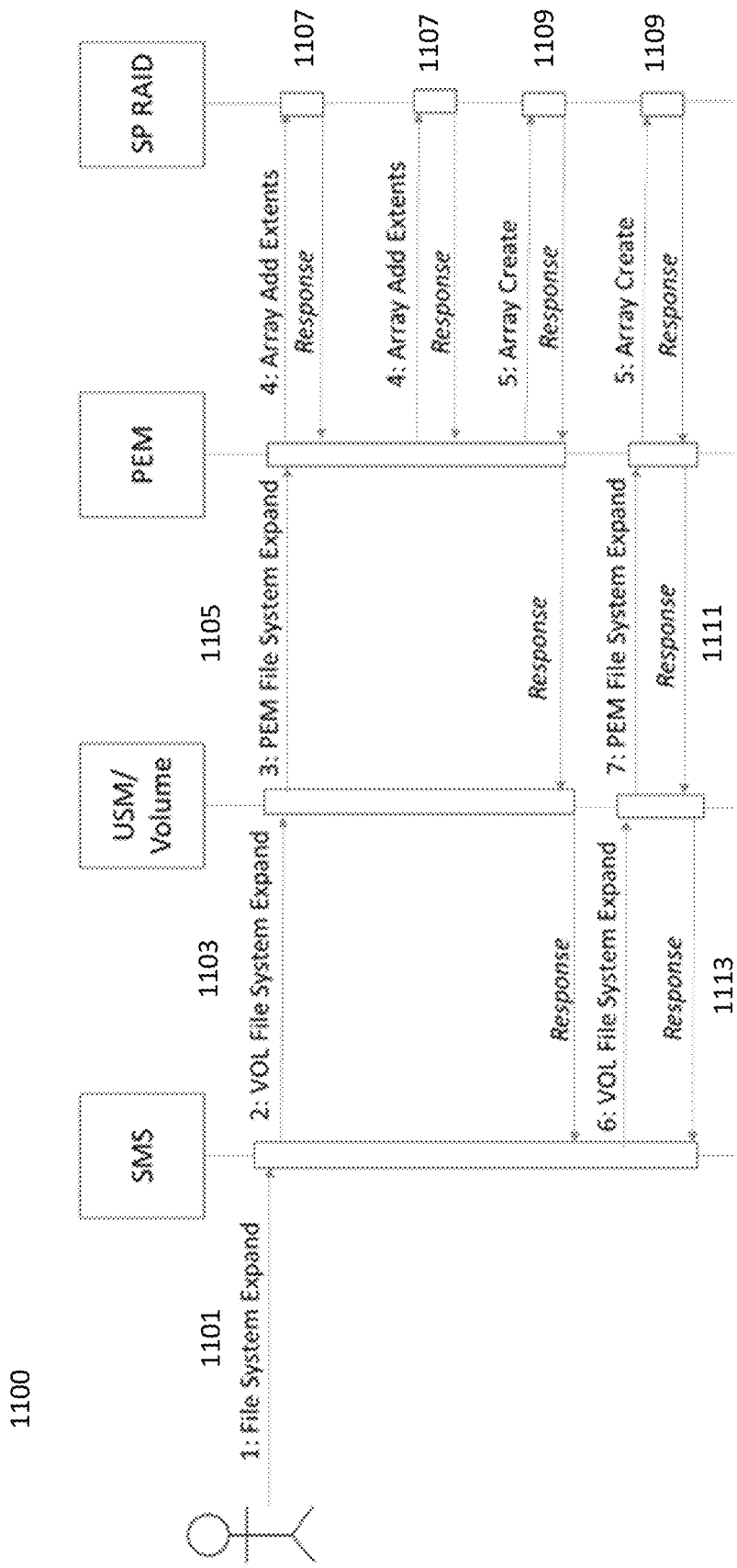
FIG. 11 is a flow diagram illustrating a method of expanding a file system, according to one embodiment.

FIG. 11 is a flow diagram illustrating a method 1100 of expanding a file system, according to one embodiment. For example, method 1100 can include a number of operations, as outlined in Table 3, below.

TABLE 3

| Blocks | Description | Parameters |
|---|---|---|
| 1: 1101 | User requests SMS expand a file system. (Storage add must be completed prior to requesting a file system create. Storage add may add capacity to 1 or more tiers from one user request. | |
| 2: 1103 | SMS checks the capacity license and request Volume to expand the file system. | Capacity, tier type |
| 3: 1105 | PEM will use the supplied capacity and first check the existing arrays can have addition extents, if space is available then add additional extents are added. If the requested capacity is still not met, then additional arrays will be created. PEM will issue array add extent or array creates as need to meet the capacity request. | Capacity, tier type |
| 4: 1107 | SP RAID driver is requested to add additional extents (one array at a time, this step is repeated as needed to meet the capacity request). | AGRP UUID |
| 5: 1109 | SP RAID driver is requested to create array(s) (this step is repeated as needed to meet the capacity request) | Array info, List of VDISK, tier type |
| 6: 1113 | When more than one storage tier is expanded, SMS will issue another file system expand request to USM to expand another volume of a different tier type | Capacity, tier type |
| 7: 1111 | PEM is requested to expand existing arrays or add more arrays of the new tier type. (Step 3, 4 and 5 are repeated as necessary) | Capacity, tier type |

Figure 12:
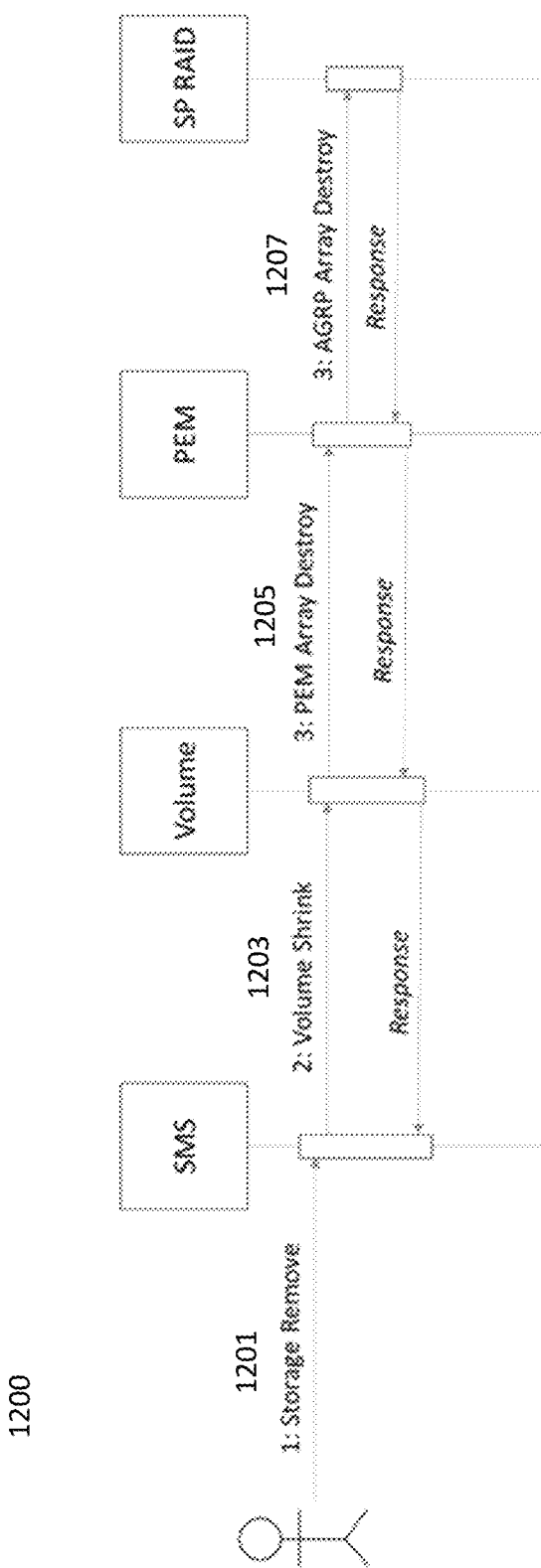
FIG. 12 is a flow diagram illustrating a method of shrinking a file system, according to one embodiment.

FIG. 12 is a flow diagram illustrating a method 1200 of shrinking a file system, according to one embodiment. For example, method 1200 can include a number of operations, as outlined in Table 4, below.

TABLE 4

| Blocks | Description | Parameters |
| --- | --- | --- |
| 1: 1201 | User requests SMS to remove in use storage from the cache tier. | Disk identified by enclosure and slot |
| 2: 1203 | SMS will use the enclosure slot to determine which cache array is allocated on the specified disk. SMS will then issue volume a shrink request specifying the cache array. | Cache array name or UUID |
| 3: 1205 | Volume instructs PEM to destroy the cache array. | Array UUID |
| 4: 1207 | PEM requests the AGRP to destroy the array. | Array UUID |

Figure 13:
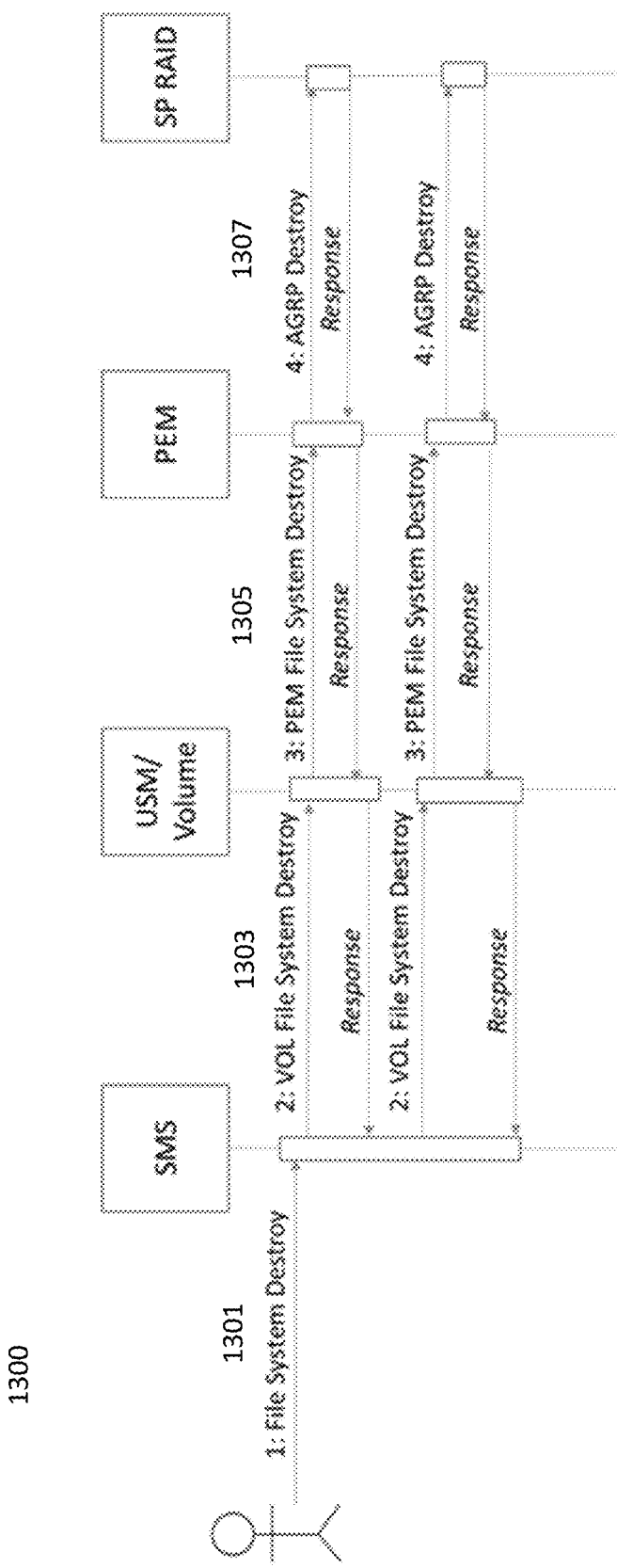
FIG. 13 is a flow diagram illustrating a method of destroying a file system, according to one embodiment.

FIG. 13 is a flow diagram illustrating a method 1300 of destroying a file system, according to one embodiment. For example, method 1300 can include a number of operations, as outlined in Table 5, below.

TABLE 5

| Blocks | Description | Parameters |
| --- | --- | --- |
| 1: 1301 | User requests SMS to destroy an existing a file system (could contain 1 or more tiers). | |
| 2: 1303 | SMS will issue a File System Destroy to USM for each tier type | Tier type |
| 3: 1305 | PEM will issue an AGRP destroy specifying the volume tier being destroyed. | Tier type AGRP UUID |
| 4: 1307 | SP RAID AGRP will destroy all arrays of the specified tier type. After the array of the requested tier type are destroyed if arrays of a different tier still exist the AGRP is not destroyed. During the destroy operation when all arrays are destroyed the AGRP is then destroyed. Specifying a tier type of '0' will destroy all array and the AGRP in one operation. | Tier type AGRP UUID |

Figure 14:
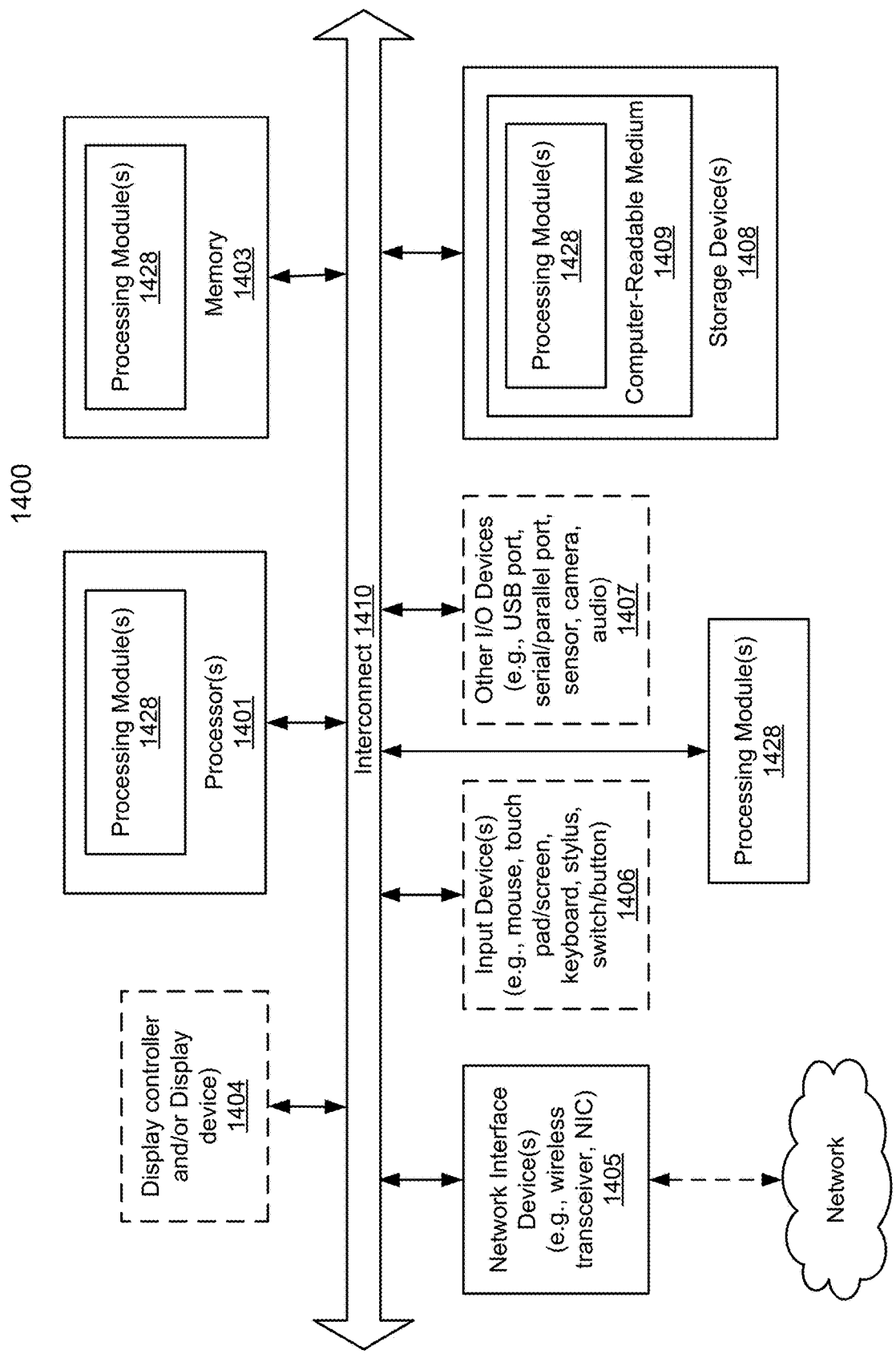
FIG. 14 is a block diagram illustrating a data processing system according to one embodiment.

FIG. 14 is a block diagram illustrating an example of a data processing system which may be used with one embodiment of the invention. For example, system 1400 may represent any of data processing systems described above performing any of the processes or methods described above. System 1400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1400 is intended to show a high level view of many components of the computer system. However, it is to be understood that additional components may be present in certain implementations and furthermore, different arrangement of the components shown may occur in other implementations. System 1400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1400 includes processor 1401, memory 1403, and devices 1405-1408 via a bus or an interconnect 1410. Processor 1401 may represent a single processor or multiple processors with a single processor core or multiple processor cores included therein. Processor 1401 may represent one or more general-purpose processors such as a microprocessor, a central processing unit (CPU), or the like. More particularly, processor 1401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1401, which may be a low power multi-core processor socket such as an ultra-low voltage processor, may act as a main processing unit and central hub for communication with the various components of the system. Such processor can be implemented as a system on chip (SoC). Processor 1401 is configured to execute instructions for performing the operations and operations discussed herein. System 1400 may further include a graphics interface that communicates with optional graphics subsystem 1404, which may include a display controller, a graphics processor, and/or a display device.

Processor 1401 may communicate with memory 1403, which in one embodiment can be implemented via multiple memory devices to provide a given amount of system memory. Memory 1403 may include one or more volatile storage (or memory) devices such as random access memory (RAM), dynamic RAM (DRAM), synchronous DRAM (SDRAM), static RAM (SRAM), or other types of storage devices. Memory 1403 may store information including sequences of instructions that are executed by processor 1401, or any other device. For example, executable code and/or data of a variety of operating systems, device drivers, firmware (e.g., input output basic system or BIOS), and/or applications can be loaded in memory 1403 and executed by processor 1401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1400 may further include IO devices such as devices 1405-1408, including network interface device(s) 1405, optional input device(s) 1406, and other optional IO device(s) 1407. Network interface device 1405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1406 may include a mouse, a touch pad, a touch sensitive screen (which may be integrated with display device 1404), a pointer device such as a stylus, and/or a keyboard (e.g., physical keyboard or a virtual keyboard displayed as part of a touch sensitive screen). For example, input device 1406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1407 may include an audio device. An audio device may include a speaker and/or a microphone to facilitate voice-enabled functions, such as voice recognition, voice replication, digital recording, and/or telephony functions. Other IO devices 1407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1407 may further include an imaging processing subsystem (e.g., a camera), which may include an optical sensor, such as a charged coupled device (CCD) or a complementary metal-oxide semiconductor (CMOS) and/or an optical sensor, utilized to facilitate camera functions, such as recording photographs and video clips. Certain sensors may be coupled to interconnect 1410 via a sensor hub (not shown), while other devices such as a keyboard or thermal sensor may be controlled by an embedded controller (not shown), dependent upon the specific configuration or design of system 1400.

To provide for persistent storage of information such as data, applications, one or more operating systems and so forth, a mass storage (not shown) may also couple to processor 1401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1401, e.g., via a serial peripheral interface (SPI). This flash device may provide for non-volatile storage of system software, including a basic input/output software (BIOS) as well as other firmware of the system.

Storage device 1408 may include computer-accessible storage medium 1409 (also known as a machine-readable storage medium or a computer-readable medium) on which is stored one or more sets of instructions or software (e.g., processing module, unit, and/or logic 1428) embodying any one or more of the methodologies or functions described herein. Processing module/unit/logic 1428 may represent any of the components described above. Processing module/unit/logic 1428 may also reside, completely or at least partially, within memory 1403 and/or within processor 1401 during execution thereof by data processing system 1400, memory 1403 and processor 1401 also constituting machine-accessible storage media. Processing module/unit/logic 1428 may further be transmitted or received over a network via network interface device 1405.

Computer-readable storage medium 1409 may also be used to store some of the software functionalities described above persistently. While computer-readable storage medium 1409 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1428, components and other features described herein can be implemented as discrete hardware components or integrated in the functionality of hardware components such as ASICS, FPGAs, DSPs or similar devices. In addition, processing module/unit/logic 1428 can be implemented as firmware or functional circuitry within hardware devices. Further, processing module/unit/logic 1428 can be implemented in any combination hardware devices and software components.

Note that while system 1400 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which may have fewer or more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   collecting and initializing physical extent manager (PEM) metadata, using a PEM daemon thread, wherein a PEM is configured to run on each of a plurality of nodes;
   creating a request queue, using the PEM daemon thread, for all requests submitted to the PEM;
   scanning the request queue, using a PEM worker thread, to handle incoming requests submitted to the PEM; and
   listening for multicast messages, using a PEM multicast listener thread, to be handled by the PEM worker thread.

2. The method of claim 1, wherein the PEM worker thread is configured to add new storage to a node for use by a protection pool.

3. The method of claim 1, wherein the PEM worker thread is configured to create, expand, or destroy a file system, the file system including at least one array group (AGRP) with one or more arrays.

4. The method of claim 1, wherein the PEM worker thread is configured to create or destroy an AGRP, wherein destroying an AGRP results in automatically destroying any arrays within the AGRP.

5. The method of claim 1, wherein the PEM worker thread is configured to create, expand, or destroy an array.

6. The method of claim 1, wherein the PEM worker thread is configured to handle multicast requests having multiple sub-requests.

7. The method of claim 1, wherein the PEM worker thread is configured to destroy a local disk manager (LDM) and free up all storage managed by the destroyed LDM.

8. A non-transitory machine-readable medium having instructions stored therein, which when executed by a processor, cause the processor to perform operations comprising:
   collecting and initializing physical extent manager (PEM) metadata, using a PEM daemon thread, wherein a PEM is configured to run on each of a plurality of nodes;
   creating a request queue, using the PEM daemon thread, for all requests submitted to the PEM;
   scanning the request queue, using a PEM worker thread, to handle incoming requests submitted to the PEM; and
   listening for multicast messages, using a PEM multicast listener thread, to be handled by the PEM worker thread.

9. The non-transitory machine-readable medium of claim 8, wherein the PEM worker thread is configured to add new storage to a node for use by a protection pool.

10. The non-transitory machine-readable medium of claim 8, wherein the PEM worker thread is configured to create, expand, or destroy a file system, the file system including at least one array group (AGRP) with one or more arrays.

11. The non-transitory machine-readable medium of claim 8, wherein the PEM worker thread is configured to create or destroy an AGRP, wherein destroying an AGRP results in automatically destroying any arrays within the AGRP.

12. The non-transitory machine-readable medium of claim 8, wherein the PEM worker thread is configured to handle multicast requests having multiple sub-requests.

13. The non-transitory machine-readable medium of claim 8, wherein the PEM worker thread is configured to destroy a local disk manager (LDM) and free up all storage managed by the destroyed LDM.

14. A system comprising:
   a processor; and
   a memory to store instructions, which when executed by the processor, cause the processor to perform operations comprising:
      collecting and initializing physical extent manager (PEM) metadata, using a PEM daemon thread, wherein a PEM is configured to run on each of a plurality of nodes;
      creating a request queue, using the PEM daemon thread, for all requests submitted to the PEM;
      scanning the request queue, using a PEM worker thread, to handle incoming requests submitted to the PEM; and
      listening for multicast messages, using a PEM multicast listener thread, to be handled by the PEM worker thread.

15. The system of claim 14, wherein the PEM worker thread is configured to add new storage to a node for use by a protection pool.

16. The system of claim 14, wherein the PEM worker thread is configured to create, expand, or destroy a file system, the file system including at least one array group (AGRP) with one or more arrays.

17. The system of claim 14, wherein the PEM worker thread is configured to create or destroy an AGRP, wherein destroying an AGRP results in automatically destroying any arrays within the AGRP.

18. The system of claim 14, wherein the PEM worker thread is configured to create, expand, or destroy an array.

19. The system of claim 14, wherein the PEM worker thread is configured to handle multicast requests having multiple sub-requests.

20. The system of claim 14, wherein the PEM worker thread is configured to destroy a local disk manager (LDM) and free up all storage managed by the destroyed LDM.

* * * * *